3,025,296
PREPARATION OF 1,3-DINITRO-5-NITRATO-HEXAHYDROPYRIMIDONE-2
Kenneth G. Phillips, Chicago, Ill., assignor to Nalco Chemical Company, Chicago, Ill., a corporation of Delaware
No Drawing. Filed Aug. 3, 1959, Ser. No. 831,001
1 Claim. (Cl. 260—251)

This invention relates to the method of preparing the compound 1,3-dinitro-5-nitrato-hexahydropyrimidone - 2 having the formula:

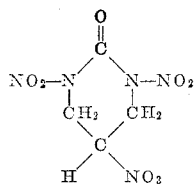

This compound is a pale-yellow solid having a melting point of 113° to 114° C. It is prepared by nitration of 5-hydroxyhexahydropyrimidone-2.

5-hydroxy-hexahydropyrimidone-2 may be prepared by reacting a halohydrin with urea or by hydrolyzing 2-nitro-amino-1,3-diazo-2-cyclohexene. These preparative techniques are reported in 13 Roczniki Chem., 375–8, and 72 J. Amer. Chem. Soc., 3205–6 respectively.

The nitration of 5-hydroxy-hexahydropyrimidone-2 is conducted using as the nitration medium from 2 to 10 moles of acetic anhydride and from 3 to 15 moles of nitric acid per mole of the 5-hydroxy-hexahydropyrimidone-2. The initial portion of the reaction is conducted at a temperature ranging between −15° C. to at about 10° C. If these temperatures are maintained atmospheric pressure is suitable for conducting the reaction. It is, of course, understood vacuum or pressure conditions with corresponding temperature adjustments may be used without departing from the spirit of the invention.

The 5-hydroxy-hexahydropyrimidone-2 is preferably added to the nitration mixture over a period of time ranging from between 5 and 30 minutes at the temperature specified. Good stirring to prevent local zones of concentration from forming should be maintained throughout the reaction.

After the 5-hydroxy-hexahydropyrimidone-2 has been added to the nitration mixture, the temperature is then elevated to between 40° C. to about 60° C. for from 10 to 20 minutes to complete the reaction. Lower temperatures such as 30° C. for about 60 minutes may also be employed during this stage of the reaction, The finished product of the reaction is purified by precipitation and then crystallizing from a solvent such as dioxane.

When small quantities of the nitrating mixture in relation to the 5-hydroxy-hexahydropyrimidone-2 are used it is sometimes desirable to dilute the nitration mixture with glacial acetic acid.

The above preparative techniques are illustrated by the following example.

*Example*

One hundred percent nitric acid (2.10 ml.) was added at 0° with stirring to acetic anhydride (5.6 ml.). 0.36 gram of 5-hydroxy-hexahydropyrimidone-2 were added cautiously to the foregoing mixture at 0° C. over a period of five minutes. Following this addition, the temperature was raised to 50° C. and was maintained at this temperature for ten minutes. The reaction mass was cooled and poured onto ice. The product was then dissolved in acetone and precipitated with water. The yield of 1,3-dinitro-5-nitrate-hexahydropyrimidone-2 was 0.54 gram.

1,3-dinitro-5-nitrato-hexahydropyrimidone-2 is an exceptionally powerful explosive. Its power is as great as nitroglycerine; yet it possesses a rate of detonation equivalent to the well-known explosive cyclonite. It is relatively stable to shock; hence, it may be safely handled and stored.

The product is easily detonated using such detonants as the heavy metal azides or fulminates.

This application is a continuation-in-part of my co-pending application, Serial No. 772,178, filed November 6, 1958, and now abandoned, the disclosure of which is incorporated herein by reference.

The invention is hereby claimed as follows:

The process of preparing 1,3-dinitro-5-nitrato-hexahydropyrimidone-2 which comprises reacting 5-hydroxy-hexahydropyrimidone-2 with a nitration mixture comprising from 2 to 10 moles of acetic anhydride and from 3 to 15 moles of nitric acid per mole of 5-hydroxy-hexahydropyrimidone-2 at a temperature of from −15° C. to 10° C. for from 5 to 30 minutes and then increasing the temperature of the reaction mass to between 30° C. to 60° C. for from 10 to 60 minutes to complete the reactions.

References Cited in the file of this patent

McKay et al.: J. Amer. Chem. Soc., vol. 70 (1948), pages 3990–3994.
Lothrop: Chemical Reviews, vol. 44 (1949), pages 419–45 at 419–20.
McKay et al.: J. Amer. Chem. Soc., vol. 71 (1949), pages 1970–1973.